(12) United States Patent  
Horowy et al.

(10) Patent No.: US 9,245,699 B2
(45) Date of Patent: Jan. 26, 2016

(54) CIRCUIT BREAKER MODULE

(71) Applicants: John Horowy, Rockford, IL (US); Debabrata Pal, Hoffman Estates, IL (US)

(72) Inventors: John Horowy, Rockford, IL (US); Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 515 days.

(21) Appl. No.: 13/633,194

(22) Filed: Oct. 2, 2012

(65) Prior Publication Data

US 2014/0091617 A1 Apr. 3, 2014

(51) Int. Cl.
*H01H 9/52* (2006.01)
*H02J 4/00* (2006.01)

(52) U.S. Cl.
CPC .. *H01H 9/52* (2013.01); *H02J 4/00* (2013.01); *H01H 2009/523* (2013.01)

(58) Field of Classification Search
CPC .............. H01H 9/52; H01H 2009/526; H05K 7/2089–7/209
See application file for complete search history.

(56) References Cited

U.S. PATENT DOCUMENTS

| | | | |
|---|---|---|---|
| 4,940,421 A * | 7/1990 | Kano et al. ................... 439/273 |
| 5,283,542 A * | 2/1994 | Ochiai et al. ...................... 335/6 |
| 5,859,580 A * | 1/1999 | Hashizawa et al. ........... 337/260 |
| 6,002,580 A * | 12/1999 | LeVantine et al. ............. 361/634 |
| 6,086,388 A * | 7/2000 | Sloey et al. ..................... 439/110 |
| 6,402,572 B1 * | 6/2002 | Sevier et al. .................... 439/748 |
| 6,784,783 B2 * | 8/2004 | Scoggin et al. ................. 337/194 |
| 7,476,108 B2 * | 1/2009 | Swain et al. ..................... 439/79 |
| 8,094,436 B2 * | 1/2012 | Mills et al. ..................... 361/636 |
| 8,138,864 B2 | 3/2012 | Mills et al. |
| 8,649,160 B2 * | 2/2014 | Mills et al. ..................... 361/636 |
| 8,872,054 B2 * | 10/2014 | Yamazaki et al. ............. 218/134 |
| 2009/0027154 A1 | 1/2009 | Mills et al. |
| 2011/0235244 A1 * | 9/2011 | Mills et al. ..................... 361/656 |
| 2012/0081894 A1 * | 4/2012 | Simon et al. ................... 362/235 |
| 2012/0132622 A1 * | 5/2012 | Yamazaki et al. ............. 218/118 |
| 2012/0152706 A1 | 6/2012 | Mills et al. |
| 2012/0154987 A1 | 6/2012 | Mills et al. |
| 2012/0182656 A1 | 7/2012 | Kheraluwala et al. |
| 2014/0118889 A1 * | 5/2014 | Mills et al. ..................... 361/636 |

FOREIGN PATENT DOCUMENTS

| | | |
|---|---|---|
| EP | 0531656 | 3/1993 |
| EP | 2458697 | 5/2012 |
| JP | 2010272415 | 12/2010 |

OTHER PUBLICATIONS

Extended European Search Report for European Application No. 13186428.2 dated Jan. 27, 2014.

* cited by examiner

*Primary Examiner* — Robert J Hoffberg
(74) *Attorney, Agent, or Firm* — Carlson, Gaskey & Olds, P.C.

(57) ABSTRACT

A circuit breaker module includes a breaker circuit connected to a first electrical lead and a second electrical lead, a housing surrounding the breaker circuit, wherein said first and second electrical leads extend through the housing, and wherein the housing is at least partially constructed of a thermally conductive polymer, and a heat dissipation feature contacting the housing, wherein the heat dissipation feature is operable to dissipate heat from the breaker circuit.

12 Claims, 5 Drawing Sheets

CIRCUIT BREAKER MODULE

TECHNICAL FIELD

The present disclosure is directed toward power distribution circuit breakers, and more particularly toward a circuit breaker module including multiple heat dissipation features.

BACKGROUND OF THE INVENTION

Existing power distribution systems, such as those utilized in commercial aircraft, include multiple circuit breaker modules designed to prevent over currents in the power distribution system. As current travels through the circuit breaker module, the breaker circuitry incurs a voltage drop and generates heat. This heat builds up over time, and can damage electronics within the circuit breaker module if the heat is not dissipated.

Current style circuit breaker modules are housed within plastic housings. The plastic housings are not thermally conductive, and heat generated by the breaker circuitry builds up within the housing. To prevent excess heat buildup from damaging the circuitry, the heat generated by the breaker circuitry is shunted from the circuit breaker module to a heat dissipation component. In existing systems, the heat is shunted out of the circuit breaker module over electric leads that connect the breaker circuitry to a circuit board, and heat dissipation elements connected to the circuit board are utilized to dissipate the heat.

The heat dissipation elements are constructed large enough to facilitate the additional heat dissipation of dissipating heat from both the circuit board and the circuit breaker modules. The additional size and material requirements of the heat dissipation elements due to the additional heat dissipation significantly increases the weight of the circuit board and of the power distribution system.

SUMMARY OF THE INVENTION

Disclosed is a circuit breaker module including a breaker circuit connected to a first electrical lead and a second electrical lead, a housing surrounding the breaker circuit, wherein the first and second electrical leads extend through the housing, and wherein the housing is at least partially constructed of a thermally conductive polymer, and a heat dissipation feature contacting the housing, wherein the heat dissipation feature is operable to dissipate heat from the breaker circuit.

Also disclosed is an aircraft power distribution system including a generator operable to generate electric power and a power distribution panel operable to distribute the electric power. The power distribution panel includes a plurality of circuit breaker modules, each of the circuit breaker modules including a breaker circuit connected to a first electrical lead and a second electrical lead, a housing surrounding the breaker circuit, wherein the first and second electrical leads extend through the housing, and wherein the housing is at least partially constructed of a thermally conductive polymer, and a heat dissipation feature contacting the housing, wherein the heat dissipation feature is operable to dissipate heat from the breaker circuit.

DETAILED DESCRIPTION

Figure 1:
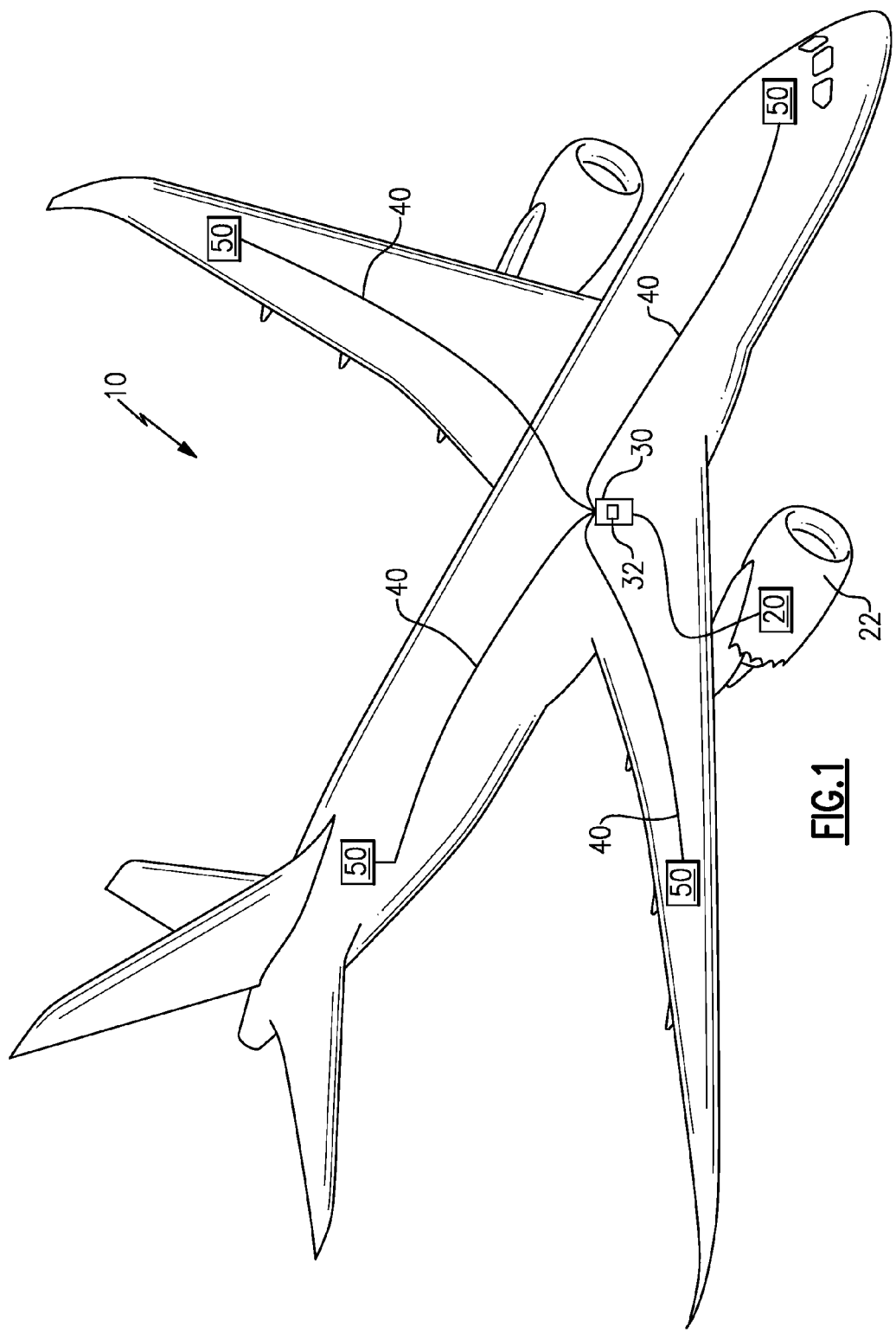
FIG. 1 schematically illustrates an aircraft power distribution system.

FIG. 1 schematically illustrates an aircraft 10. During operation of the aircraft 10, electric power is generated in a generator 20 using mechanical rotation of a jet engine 22. The electric power generated in the generator 20 is transferred to a power distribution system 30 that uses power conduits 40 to distribute electric power to multiple on board electric systems 50.

Within the power distribution system 30 are multiple circuit breaker modules 32. The circuit breaker modules 32 are mounted to circuit boards in a power distribution panel and operate to prevent current through the power distribution system 30 from exceeding pre-defined levels. As a result of this functionality, each of the circuit breaker modules 32 incurs a voltage loss due to power absorption within the breaker circuitry. The power absorption in turn causes the breaker circuitry within the circuit breaker to generate heat. In order to prevent an undesirable buildup of heat within the circuit breaker module 32, the heat is shunted to an attached circuit board and dissipated to ambient air using features of the attached circuit board.

Figure 2:
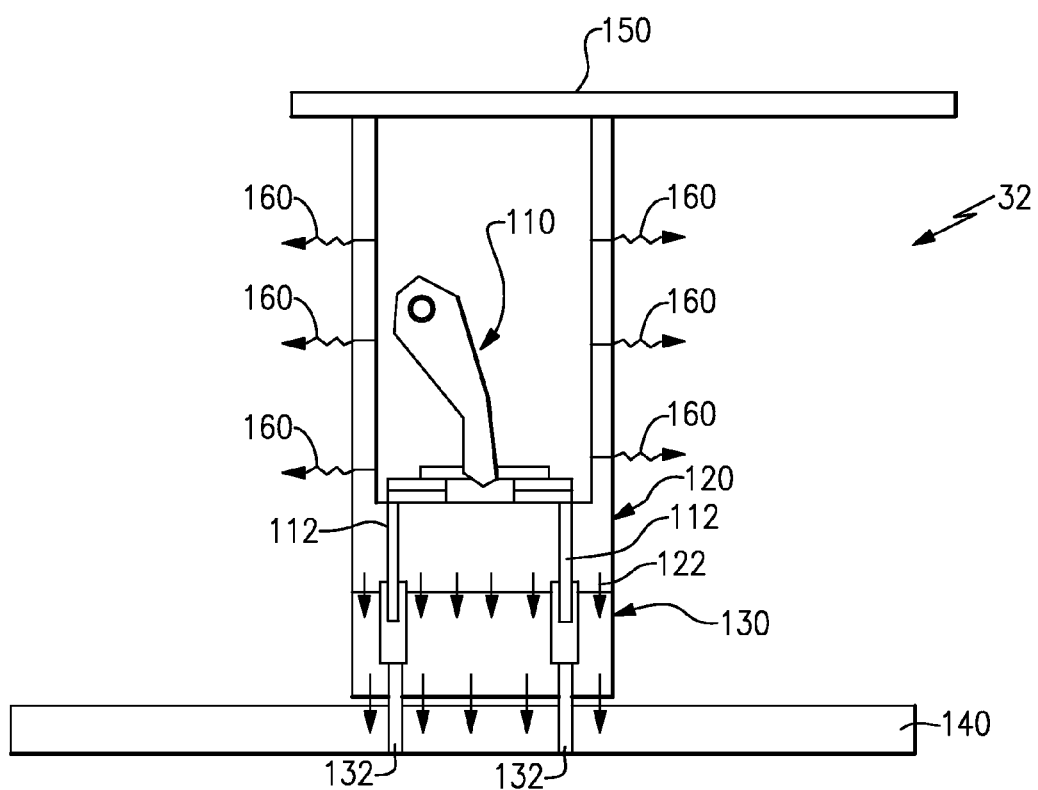
FIG. 2 schematically illustrates an example circuit breaker module.

FIG. 2 illustrates an example circuit breaker module 32 that can be used in the aircraft 10 power distribution system 30 illustrated in FIG. 1. The circuit breaker module 32 includes conventional breaker circuitry 110 encased within a housing 120. Two electric leads 112 extend from the breaker circuitry 110 and through the housing 120. The electric leads 112 connect the breaker circuitry 110 to a socket 130. The socket 130, in turn, includes socket leads 132 that connect the breaker circuitry 110 to a circuit board 140.

The housing 120 of the circuit breaker module 32 is capped by a power distribution panel 150. In alternate examples, the housing 120 can include a dedicated cap in place of the illustrated power distribution panel 150. In current circuit breaker module designs, the housing 120 and the socket 130 are constructed of an electrically insulating plastic material. The plastic used is a poor thermal conductor, and without proper heat dissipation, heat builds up to undesirable levels within the circuit breaker module 32. Existing designs shunt heat from the breaker circuitry 110 to the circuit board 140 using only the electric leads 112, 132 and allow the features of the circuit board 140 to dissipate the heat in order to prevent heat build up. Utilization of the electric leads 112, 132 in this manner places stress on the leads 112, 132 and can lead to increased wear and a shorter component life span of the circuit breaker module 32.

In contrast to conventional designs, the circuit breaker module 32 includes multiple additional heat dissipation features. As a first heat dissipation feature, the housing 120 of the illustrated circuit breaker module 32 is constructed primarily of a thermally conductive polymer, such as COOLPOLY plastics. Thermally conductive polymers are defined as being polymers having a sufficient thermal conductivity to allow heat to dissipate through the thermally conductive polymer. As a result of the housing 120 being constructed primarily of the thermally conductive polymer, heat dissipation paths 160 directly through the housing 120 into the ambient air are created, thereby reducing heat transferred through the electric leads 112, 132 and reducing the associated stresses on the leads 112, 132. In addition to being thermally conductive, the thermally conductive polymer used to construct the housing 120 is electrically insulating.

As a second heat dissipation feature, the socket 130 is similarly constructed primarily of the thermally conductive polymer. The socket 130 contacts the housing 120 and creates a thermal path 122 from the breaker circuitry 110 to the circuit board 140. The thermal path 122 passes through the socket 130 and is significantly larger than a thermal path provided solely by the electric leads 112, 132. The increased size of the thermal path 122 connecting the breaker circuitry 110 to the circuit board 140, through the socket 130, reduces the amount of heat transferred over the electric leads 112, 132 and therefore reduces the stress placed on the leads 112, 132. Reducing the stresses on the leads 112, 132 increases the expected lifespan of the leads 112,132. In some alternate examples, the socket 130 doubles as an adaptor and allows the circuit breaker module 32 to connect to a circuit board 140 having a different lead configuration than the lead configuration of the circuit breaker module 32. Between the socket 130 and the circuit board 140, a thermal interface material layer can be added which will enhance conduction heat transfer from the socket 130 to circuit board 140. In addition, this thermal interface material has two internal cut outs so the leads 112 can pass through it.

Figure 3:
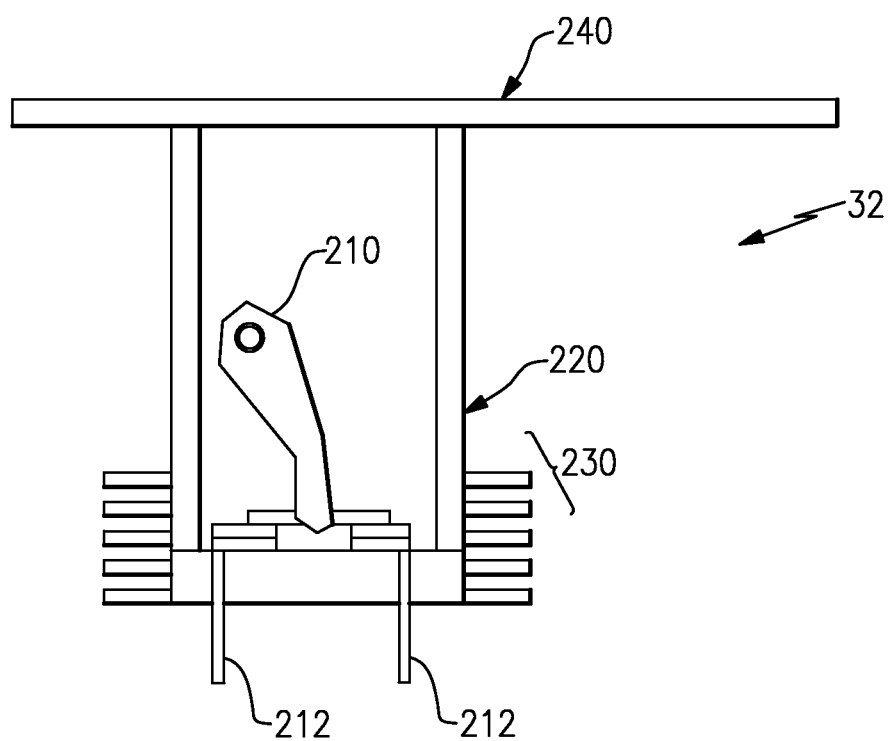
FIG. 3 schematically illustrates a first alternate example circuit breaker module.

FIG. 3 illustrates an alternate circuit breaker module 32, with an additional heat dissipation feature in the form of heat fins 230. As in the example circuit breaker module 32 of FIG. 1, the circuit breaker module 32 has breaker circuitry 210 connected to electric leads 212 extending from the breaker circuitry 210. A housing 220 encapsulates the breaker circuitry 210 and is constructed of a thermally conductive polymer, thereby allowing heat to dissipate through the housing 220 into the ambient atmosphere. In addition to the features described above, the example of FIG. 3 includes multiple heat fins 230 connected to the housing 220 of the circuit breaker module 32. The heat fins 230 can be integral to the housing 220, or can be affixed to the housing 220 using any known adhesion technique. When the heat fins 230 are integral to the housing 220, the heat fins 230 are also constructed primarily of a thermally conductive polymer. When the heat fins 230 are adhered to the housing 220 instead of integral to the housing, the heat fins 230 can be any suitably thermally conductive material.

While the heat fins 230 are illustrated connected to a portion of the housing 220 closest to the electric leads 212, the heat fins 230 can be positioned anywhere on the housing 220 and achieve the same benefit. The location of the heat fins 230 on the housing 220, and the amount of heat fins 230, can be adapted depending on the form factor requirements of the application in which the circuit breaker module is being used.

The heat fins 230 improve the heat dissipation of the circuit breaker module 32 by increasing the surface area of the housing 220 that is exposed to the ambient air, and thereby increasing the amount of heat that can be dissipated from the housing 220 in a given time period.

In another example embodiment, the heat fins 230 and the socket 130 are combined, and the socket 130 includes heat fins, thereby further increasing the surface area of the thermally conductive polymer exposed to the ambient air.

Figure 4:
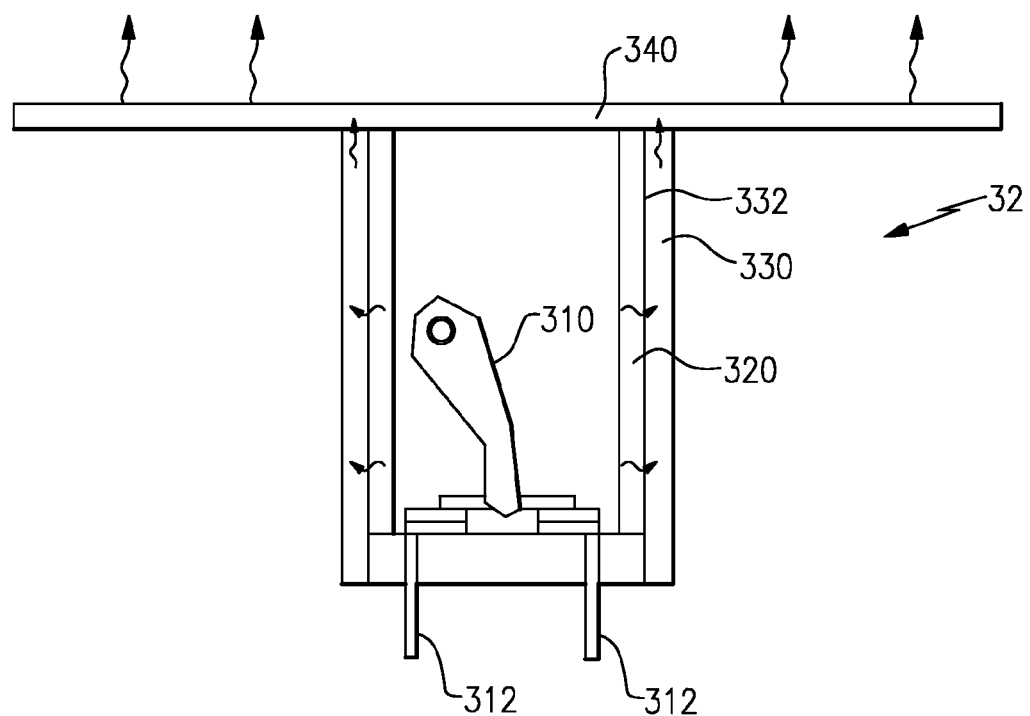
FIG. 4 schematically illustrates a second alternate example circuit breaker module.

FIG. 4 illustrates another alternate circuit breaker module 32. The alternate circuit breaker module 32 of FIG. 4 includes a cooling shell as an additional heat dissipation feature. The breaker circuitry 310 and at least a portion of the housing 320 are located within The cooling shell 330. The cooling shell 330 is connected to a panel surface 340. As with each of the previously described examples, the circuit breaker module 32 includes breaker circuitry 310 located within a housing 320 constructed primarily of a thermally conductive polymer. Electric leads 312 extend through the housing 320 and connect the breaker circuitry 310 to a circuit board. A panel surface 340 caps the top of the circuit breaker module 32, thereby sealing the breaker circuitry 310 inside.

The cooling shell 330 extends from the panel surface 340 and contacts the circuit breaker module housing 320 along an interior surface 332 of the cooling shell 330. The panel surface 340 and the cooling shell 330 are constructed of a highly thermally conductive material, such as aluminum, and provide an efficient thermal pathway directing heat generated in the breaker circuit 310 through the circuit breaker module housing 320 into the cooling shell 330 and then into the panel surface 340. Heat is then dissipated from an exterior surface of the cooling shell 330 and multiple surfaces of the panel surface 340 into the ambient air. Thus, the utilization of a cooling shell 330 enhances the thermal conductivity of the thermally conductive housing 320 and increases the ability of the circuit breaker module 32 to dissipate heat.

While the illustrated configuration includes a cooling shell 330 extending the full length of the circuit breaker module 32, an alternate configuration can include a cooling shell 330 that extends only partially along the housing 320. Utilizing a partial cooling shell further allows the heat fins 230, illustrated in FIG. 3, to be included along with the cooling shell 330, thereby further enhancing the cooling capabilities of the circuit breaker module.

Figure 5:
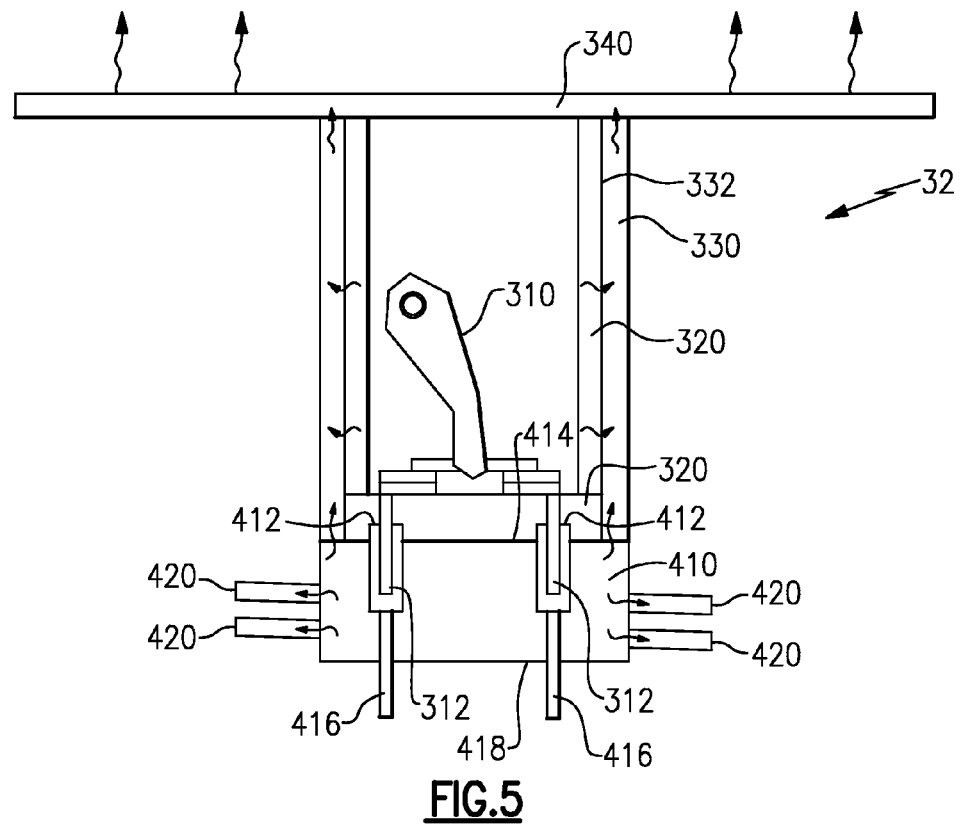
FIG. 5 illustrates an example socket for utilization with a circuit breaker module.

FIG. 5 illustrates a socket 410 having a plurality of openings 412 on a first side 414. Each of the openings 412 is operable to receive one of a first and second lead 312. The socket 410 includes a plurality of socket leads 416 extending from a second side 418. The first side 414 of the socket 410 contacts a housing 320 surrounding a breaker circuit 310. The socket 410 further includes a plurality of heat fins 420 extending from said socket.

Figure 6:
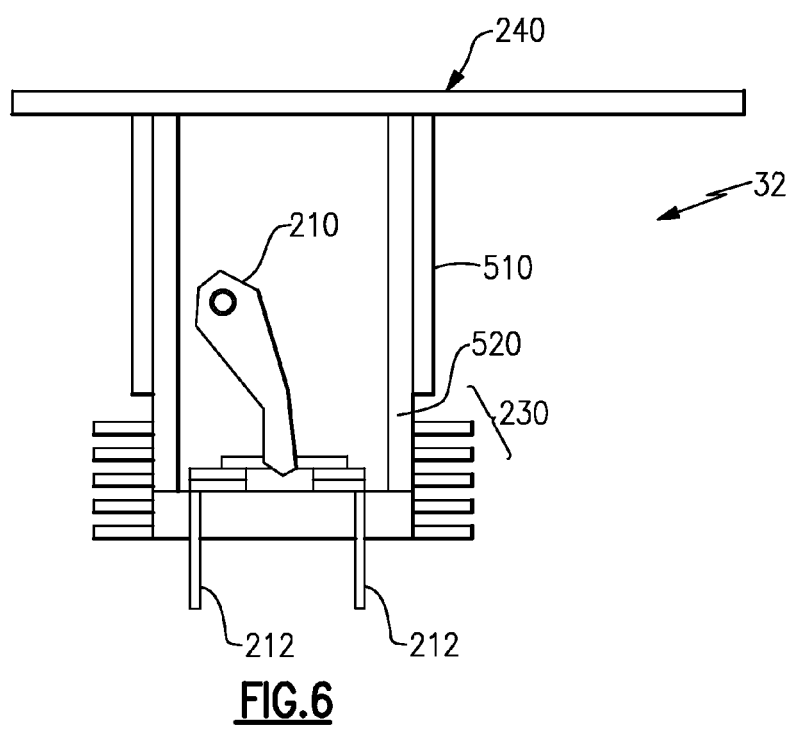
FIG. 6 illustrates an example combination of multiple heat dissipation features for a circuit breaker module.

It is further understood that each of the above heat dissipation features can be used together or in any combination to provide a more efficient circuit breaker module. By way of example, FIG. 6 illustrates a combination of a plurality of heat fins 230 extending from a housing 520, and a cooling shell 510 extending partially along the housing 520.

Although a embodiment of this invention has been disclosed, a worker of ordinary skill in this art would recognize that certain modifications would come within the scope of this invention. For that reason, the following claims should be studied to determine the true scope and content of this invention.

The invention claimed is:

1. A circuit breaker module comprising:
 a breaker circuit connected to a first electrical lead and a second electrical lead;
 a breaker housing surrounding said breaker circuit, wherein said first and second electrical leads extend through said breaker housing, and wherein said breaker housing is at least partially constructed of a thermally conductive polymer; and
 a socket body at least partially constructed of a first thermally conductive polymer;
 a plurality of openings on a first side of said socket body, each of said openings operable to receive a respective one of said first and second electrical leads;
 a plurality of socket leads extending from a second side of said socket body, each of said socket leads being electrically connected to one of the first and second electrical leads when each of said openings receives the respective one of said first and second electrical leads; and the socket body including a surface contacting a surface of the breaker housing such that said socket body is operable to dissipate heat from said breaker circuit through said socket body; and a thermally conducting cooling shell having an interior surface, the interior surface of said cooling shell contacting said breaker housing and a portion of said cooling shell contacting a panel such that a thermal path is established from said breaker housing to said panel through said cooling shell.

2. The circuit breaker module of claim 1, wherein said socket body is constructed at least partially of one of said first thermally conductive polymer or a second thermally conductive polymer.

3. The circuit breaker module of claim 1, wherein said socket body further comprises a plurality of heat fins extending from the socket body.

4. An aircraft power distribution system comprising:
a generator operable to generate electric power;
a power distribution panel operable to distribute said electric power, wherein said power distribution panel includes a plurality of circuit breaker modules, each of said circuit breaker modules comprising:
   a breaker circuit connected to a first electrical lead and a second electrical lead;
   a breaker housing surrounding said breaker circuit, wherein said first and second electrical leads extend through said breaker housing, and wherein said breaker housing is at least partially constructed of a thermally conductive polymer; and
   a thermally conductive cooling shell disposed about said breaker housing, an interior surface of said cooling shell contacting an exterior surface of said breaker housing and a portion of said cooling shell contacts a panel, wherein said thermally conductive cooling shell is operable to dissipate heat from said breaker circuit.

5. The aircraft power distribution system of claim 4, further including a socket having a plurality of openings on a first side of said socket, each of said openings being operable to receive one of said first and second electrical leads, and a plurality of socket leads extending from a second side of said socket, each of said plurality of socket leads being electrically connected to a corresponding one of said first and second electrical leads, wherein said first side of said socket contacts said breaker housing.

6. The aircraft power distribution system of claim 5, wherein said socket is constructed at least partially of a thermally conductive polymer.

7. The aircraft power distribution system of claim 5, wherein said socket further comprises a socket body and a plurality of heat fins extending from said socket body.

8. The aircraft power distribution system of claim 4, further including a plurality of heat fins extending outward from said breaker housing, and wherein said heat fins are integral to said breaker housing and are constructed primarily of a thermally conductive polymer.

9. The aircraft power distribution system of claim 8, wherein said heat fins are adhered to said breaker housing.

10. The aircraft power distribution system of claim 4, further including a plurality of heat fins extending from said breaker housing and a thermally conductive socket connecting said breaker housing to a circuit board.

11. The aircraft power distribution system of claim 4, wherein the cooling shell extends partially along said breaker housing, and wherein the breaker housing further includes a plurality of heat fins extending outward from the breaker housing.

12. The aircraft power distribution system of claim 11, further comprising a thermally conductive socket connecting said breaker housing to a circuit board.

\* \* \* \* \*